Sept. 20, 1949. E. J. HACKETHORN 2,482,107
MANUALLY OPERABLE FOCUSING DEVICE FOR CAMERAS
Filed May 3, 1946
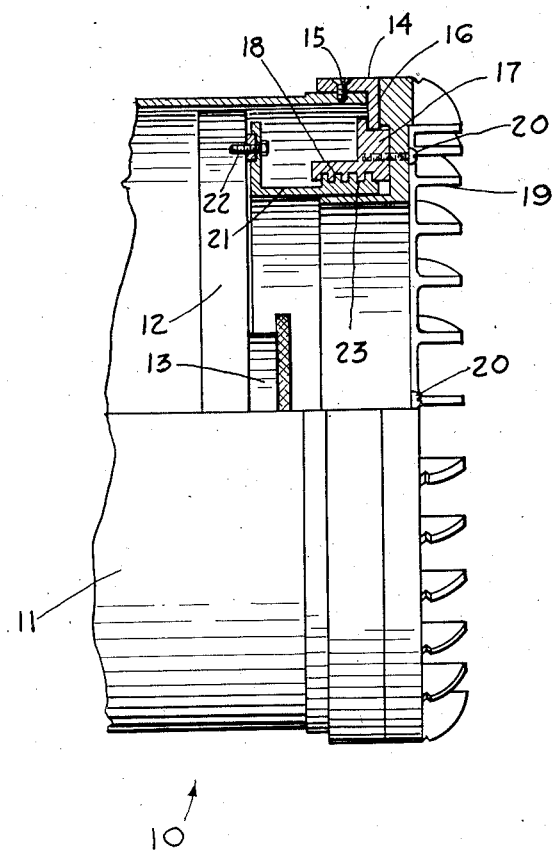
Inventor
EARL J. HACKETHORN
By
Attorney Patented Sept. 20, 1949

2,482,107

UNITED STATES PATENT OFFICE 2,482,107

MANUALLY OPERABLE FOCUSING DEVICE FOR CAMERAS

Earl J. Hackethorn, Kansas City, Mo.

Application May 3, 1946, Serial No. 666,943

1 Claim. (Cl. 95—45)

(Granted under the act of March 3, 1883, as amended April 30, 1928; 370 O. G. 757)

This invention relates to focusing devices and more particularly to devices for varying the focus of cameras or the like.

Objects of the invention are to provide improved devices for adjusting the position of a camera lens with respect to the film and thereby vary the focus; to provide improved focusing devices adapted to be installed on cameras without appreciably altering the structure of the latter; and to provide for carrying out the foregoing objects in a facile, economical and efficient manner.

In accomplishing these and other objects of the present invention, I have provided improved details of structure, a preferred form of which is shown in the accompanying drawing, wherein:

The figure of the drawing is a side elevational view, partly in section, of a portion of a camera having installed thereon a focusing device embodying the features of the present invention.

Referring more in detail to the drawing, there is shown at 10 a portion of a camera of known design which includes a tubular camera cone 11; a lens mount 12 slidably mounted in said camera cone, but retained against relative rotation; and a lens 13 fixed to said lens mount. The focus of the camera may be varied by slidably adjusting the lens mount, and consequently the lens, longitudinally of the cone.

The focusing device of the present invention includes a retaining ring 14 fixed to the forward end of the camera cone by any suitable means, as, for example, set screws 15. The retaining ring has an inwardly projecting circumferential flange 16.

An annular collar 17 is rotatably mounted in the retaining ring behind the flange 16 and is interiorly threaded, as indicated at 18. An annular manual adjustment member 19 is secured to the collar outside of the flange 16, as by the screws 20. The collar 17 and adjustment member 19 are thus rotatable as a unit and are retained in a longitudinally fixed position by the retaining ring 14.

A ring 21 is secured to the lens mount 12, as by the screws 22, and is exteriorly threaded, as indicated at 23. The threads 23 engage the interior threads 18 of the collar 17.

Since the lens mount is retained against rotation, it is seen that rotation of the adjustment member 19 rotates the collar 17 relative to the ring 21 and thereby adjusts the latter longitudinally within the camera cone to vary the focus of the camera.

While I have shown but a single embodiment of the present invention, it is obvious that the structure is subject to modification without departing from the spirit of the invention. Therefore, I do not wish to be limited by the disclosure set forth, but only by the scope of the appended claim.

The invention described herein may be manufactured and used by or for the Government of the United States of America for governmental purposes without the payment of any royalties thereon or therefor.

What is claimed is:

A focusing device for the lens positioned in the cone of a camera comprising a retaining ring detachably fastened to the cone of the camera, an inwardly extending flange on said ring, an annular, interiorly threaded collar rotatably mounted within said retaining ring, an outwardly extending flange on said collar of greater diameter than the diameter of said inwardly extending flange of said retaining ring, said outwardly extending flange being located behind said inwardly extending flange in lapping relationship thereto, an annular manual adjustment member secured to and extending outwardly in front of said collar, an integral flange on said adjustment member extending inwardly therefrom in spaced relationship to said interiorly threaded collar and coaxial therewith, an exteriorly threaded cylindrical ring provided with an outwardly extending flange in threaded engagement with said interiorly threaded collar and in sliding contact with said integral flange on said adjustment member, said cylindrical ring in sliding, non-rotating engagement with said camera cone and a lens mount secured to the flange on said cylindrical ring in axial alignment with said camera cone whereby rotation of the manual adjustment member and collar axially varies the longitudinal position of the lens mount with respect to the camera cone to focus the lens therein and whereby the adjustment member, the collar, the cylindrical ring and the lens mount are removable as a unit with said retaining ring.

EARL J. HACKETHORN.

REFERENCES CITED

The following references are of record in the file of this patent:

UNITED STATES PATENTS

| Number | Name | Date |
|--------|------|------|
| 838,651 | Seagmuller | Dec. 18, 1906 |
| 1,829,319 | Wheeler | Oct. 27, 1931 |
| 1,945,999 | Sabel | Feb. 6, 1934 |
| 2,053,231 | Taylor | Sept. 1, 1936 |
| 2,238,498 | Mihalyi | Apr. 15, 1941 |